Patented Nov. 22, 1949

2,489,233

UNITED STATES PATENT OFFICE 2,489,233

IMIDAZOLIDO-TETRAHYDROFURANS

Moses Wolf Goldberg, Upper Montclair, and Leo H. Sternbach, Montclair, N. J., assignors to Hoffmann-La Roche Inc., Roche Park, Nutley, N. J., a corporation of New Jersey No Drawing. Application April 26, 1947, Serial No. 744,152

20 Claims. (Cl. 260—309)

1

Our invention relates to new compounds, and more particularly to 3,4-(2'-keto-imidazolido)-2-keto-tetrahydrofurans, and to processes for their preparation.

The new compounds are valuable intermediates for the synthesis of biotin, and several specific members of our new class of compounds have already been described for this purpose in our copending application Serial No. 673,642, filed May 31, 1946, of which the instant application is a continuation-in-part. Our parent application relates to the preparation of biotin, while the present application is more specifically concerned with the 3,4-(2'-keto-imidazolido)-2-keto-tetrahydrofurans, which are new compounds, and to methods for their production.

By the term a "3,4-(2'-keto-imidazolido)-2-keto-tetrahydrofuran" or its plural form as employed herein and in the claims, we include such compounds in which either or both of the N-atoms in the imidazolido nucleus, and the 5-carbon atom in the tetrahydrofuran nucleus are substituted or unsubstituted. The substituents are preferably those which can be replaced by hydrogen. Thus, either or both of the N-atoms may carry such substituents as aralkyl radicals, for example, α-aralkyl radicals like benzyl and α- or ring-substituted benzyl, as for instance, α-methyl- and α-ethyl-benzyl, o-methyl-benzyl, p-ethyl-benzyl, p-methoxy-benzyl, p-ethoxy-benzyl; or acyl radicals, for example, lower acyl radicals as, for instance, acetyl, propionyl, butyryl; and the 5-carbon atom may carry an =O atom, or an oxy radical, such as hydroxy or acyloxy, for example, a lower acyloxy radical as, for instance, acetoxy, propionoxy, butyroxy and the like.

Thus, coming within the scope of our invention are:

(a) 3,4-[1' or 3'-monoaralkyl-(or 1'- or 3'-monoacyl)-2'-keto-imidazolido]-2-monoketo-tetrahydrofurans.

(b) 3,4-[1' or 3'-monoaralkyl-(or 1'- or 3'-monoacyl)-2'-keto-imidazolido] - 2,5-diketo-tetrahydrofurans.

(c) 3,4-[1'- or 3'-monoaralkyl-(or 1'- or 3'-monoacyl)-2'-keto - imidazolido]-2-keto - 5-oxy-tetrahydrofurans.

(d) 3,4-[1',3' - diaralkyl-(or 1',3' - diacyl)-2'-keto-imidazolido]-2-monoketo-tetrahydrofurans.

2

(e) 3,4-[1',3'-diaralkyl - (or 1',3'-diacyl) - 2'-keto-imidazolido]-2,5-diketo-tetrahydrofurans.

(f) 3,4-[1',3' - diaralkyl - (or 1',3'-diacyl)-2'-keto-imidazolido] - 2-keto-5-oxy - tetrahydrofurans.

(g) 3,4-[1'-aralkyl-3' - acyl-(or 1'-acyl-3'-aralkyl)-2'-keto-imidazolido] - 2 - monoketo-tetrahydrofurans.

(h) 3,4-[1'-aralkyl-3'-acyl - (or 1'-acyl-3'-aralkyl)-2'-keto-imidazolido] - 2,5-diketo-tetrahydrofurans.

(i) 3,4-[1'-aralkyl-3'-acyl - (or 1'-acyl-3'-aralkyl)-2'-keto-imidazolido]-2 - keto-5-oxy-tetrahydrofurans; and the corresponding compounds wherein the two N atoms are unsubstituted.

It is to be understood that the specification and claims embrace all tautomeric forms of our compounds. Moreover, it will be understood that the monoaralkyl compounds, described herein, may contain the monoaralkyl group in the 1' or 3'-position, and that the mono-acylated compounds may be N-acyl or 2'-O-acyl derivatives, the latter being derivatives of a tautomeric form; while the diacylated compounds can contain the acyl groups attached to both nitrogen atoms or to one of the nitrogen atoms and the oxygen atom in 2', in the latter case being derived from a tautomeric form. For convenience the acylated compounds are named herein with the acyl groups attached to the nitrogen atoms.

In practice, the 3,4-(2'-keto-imidazolido)-2-keto-tetrahydrofurans comprising our invention can be prepared, for example, by reacting a meso-diamino-succinic acid (I), selected from the group of meso-diamino-succinic acid itself and its N-mono-, and N,N'-diaralkyl derivatives, with phosgene in the presence of an alkali, thereby forming the corresponding imidazolidone-(2)-cis-4,5-dicarboxylic acid (II) which as such, or in the form of its alkali or alkaline earth metal salts, is ring closed by treatment with a dehydrating reagent, such as an aliphatic acid anhydride, acyl halogenide, thionyl chloride, a phosphorus halogenide, and the like, to form its corresponding anhydride, having the structure of a 3,4-(2'-keto-imidazolido)-2,5-diketo-tetrahydrofuran (III).

When an N-mono-aralkyl derivative of meso-diamino-succinic acid or meso-diamino-succinic itself is used for the reaction with phosgene, the imidazolidone-(2)-cis-4,5-dicarboxylic acids (II)

thus formed still contain, respectively, one and two reactive hydrogen atoms attached to the nitrogen atoms of the imidazolidone ring. These hydrogen atoms can be replaced, for example, by an acyl radical, such as acetyl or propionyl, and this reaction can be carried out, if required, simultaneously with the anhydrization reaction, for example, by treating the dicarboxylic acid with an acid anhydride or acyl halogenide. The acylated and nonacylated imidazolidone-(2)-cis-4,5-dicarboxylic acids (II) and the corresponding anhydrides (III) can be transformed by reductive treatment into other 3,4-(2'-keto-imidazolido)-2-keto-tetrahydrofurans embraced by our invention. A monoalkyl ester of (II) or its anhydride (III) can be directly reduced, for example, by catalytic hydrogenation, to form the corresponding 3,4-(2'-keto-imidazolido)-2-monoketo-tetrahydrofuran (VII). Alternatively (VII) can be obtained from (II) or (III) by treatment with a mixture of an aliphatic acid, the anhydride of the aliphatic acid, and a reducing metal, such as zinc, to give the corresponding 3,4-(2'-keto-imidazolido)-2-keto-5-acyloxy - tetrahydrofuran (IV), which upon hydrolysis yields the corresponding cis-4-carboxy-5-formyl-imidazolidone-2 (V) or its cyclic form, 3,4-(2'-keto-imidazolido)-2-keto-5-hydroxy - tetrahydrofuran (Va). Upon catalytic reduction (V) or (Va) yields the corresponding cis-4-carboxy-5-hydroxymethyl-imidazolidone-(2) (VI), which upon dehydration, for example, by heating, vacuum distillation, treating with an acid anhydride, thionyl chloride, a phosphorus halogenide, mineral acid or the like is ring closed to form (VII). Alternatively, (IV), (V) or (Va) can be directly hydrogenated and ring closed to (VII), in one step, the hydrogenation in the case of (IV) being carried out under slightly alkaline conditions at pH of about 8 or 9. If (VII) contains substituents in the N-atoms, one or more of these can be replaced by hydrogen as by hydrogenolysis in the case of aralkyl substituents; or by hydrolysis in the case of an acyl substituent.

When employing meso-diamino-succinic acid per se as a starting material, the imidazolidone-(2)-cis-4,5-dicarboxylic acid obtained therefrom being water soluble is isolated in the form of its water-insoluble alkali earth metal salts, as the barium salt, which can be converted to the alkali metal salts, as the sodium salt, by metathesis with a suitable inorganic alkali metal salt, such as sodium sulfate. The salts yield the anhydride of imidazolidone-(2)-cis-4,5-dicarboxylic acid or 3,4-(2'-keto-imidazolido)-2,5-diketo-tetrahydrofuran on treatment with an acyl halide, such as acetyl chloride or thionyl chloride and the like. If the acetyl chloride is employed in large excess, the mono- and diacetyl derivatives of the anhydride are obtained. These anhydrides as well as their corresponding acids can be reduced, as described above, to form the desired 3,4-(2'-keto-imidazolido)-2-keto-5-acyloxy - tetrahydrofurans, which on treatment with alkali followed by catalytic reduction, or catalytic reduction under slightly alkaline conditions yield the corresponding 3,4-(2'-keto-imidazolido) - 2 - monoketo-tetrahydrofurans.

The following flow sheet shows the steps of the synthesis of our new compounds, the numerals having the same significance as above.

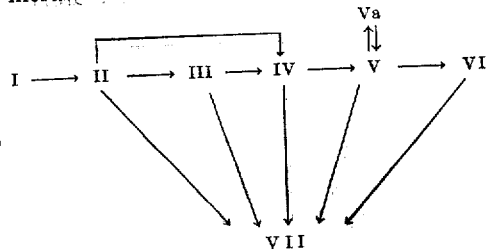

Thus the above is representative of the procedure for producing 3,4-(2'-keto-imidazolido)-2,5-diketo-, 3,4-(2'-keto-imidazolido)-2-keto-5-acyloxy (or 5-hydroxy)-, and 3,4-(2'-keto-imidazolido)-2-monoketo-tetrahydrofurans, which we have generically designated as 3,4-(2'-keto-imidazolido)-2-keto-tetrahydrofurans.

The following flow sheet will illustrate the procedure of producing our new compounds as applied to bis-benzylamino-succinic acid as a starting material, R in the formulae standing for a benzyl radical:

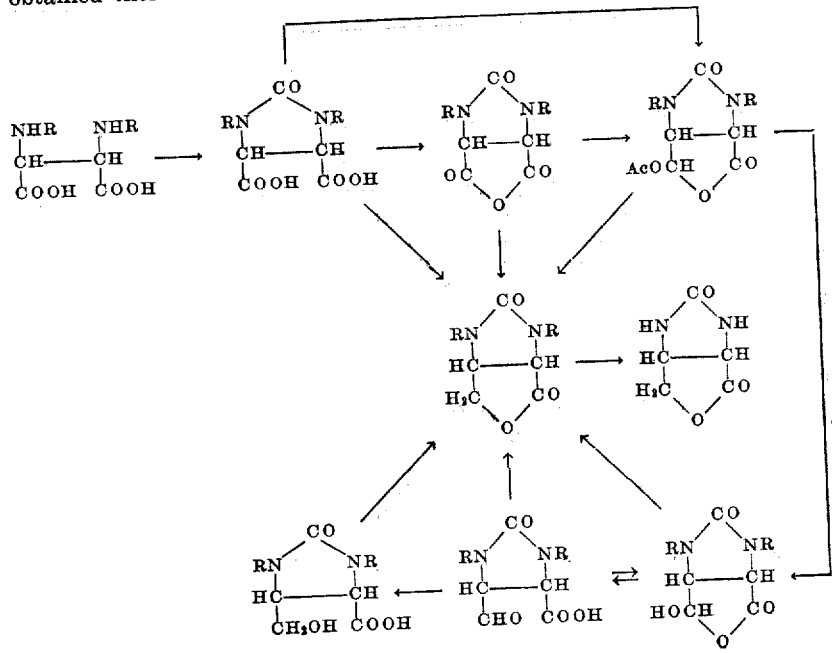

The following examples will serve to illustrate our invention, it being understood, however, that the invention is not limited thereto.

EXAMPLE 1

*1,3-dibenzyl-imidazolidone-(2)-cis-4,5-dicarboxylic acid and its anhydride*

To a stirred, ice-cooled solution of 648 grams (1.98 moles) of bis-benzylaminosuccinic acid in 2 liters of 3 N potassium hydroxide, are added in small portions (within 1½ hours) 1.6 liters of a 3.75 molar solution of phosgene in xylene (=6 moles $COCl_2$) and 2.7 liters 6 N potassium hydroxide (=14 moles). The mixtures is then acidified with concentrated hydrochloric acid, and the precipitate formed is filtered off and washed with water. The precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material. The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid remains on the funnel. It can be recrystallized from ethyl acetate forming prisms, melting first at 167° C., then resolidifying again and melting at 236° C.

The benzene mother liquor is concentrated in vacuo, and the rest of the reaction product is isolated in form of its anhydride in the following way: The oily residue is refluxed with acetic anydride, then the mixture is concentrated and benzene is added. The anhydride formed crystallizes in nice needles. Melting point is 236–237°.

By refluxing the anhydride with methanol there is obtained 1,3-dibenzyl-imidazolidone-(2)-cis-4,5-dicarboxylic acid monomethyl ester. It melts at 128–130° C. Other monoalkyl esters can be prepared in a similar way.

EXAMPLE 2

*Acetate of the cyclic form of 1,3-dibenzyl-cis-4-carboxy-5-formyl-imidazolidone-2 or 3,4-(1',3'-dibenzyl-2'-keto-imidazolido)-2-keto-5-acetoxy-tetrahydrofuran*

A mixture of 100 grams of the anhydride of 1,3-dibenzyl-imidazolidone-(2)-cis-4,5-dicarboxylic acid, 150 grams of zinc dust, 100 grams zinc powder (40 mesh), 1500 cc. acetic anhydride and 500 cc. acetic acid is stirred and refluxed for 10–15 hours. The dicarboxylic acid can be used instead of the anhydride. In that case, the acid is first mixed with the acetic anhydride, refluxed for 10 minutes and then the other constituents are added. The amounts of acetic acid and anhydride can be reduced to about ½ without affecting the yield. If too little is used the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled with acetic anhydride, in order to reconvert any of the compound decomposed during the treatment with water into the cyclic acetate. The mixture is again concentrated in vacuo. Xylene is then added to the residue, and part of it is distilled off in vacuo, then ether and petrol-ether are added. The reaction product separates in fine needles or prisms, which melt at 103–104° C. After drying, the melting point is 124–125° C.

EXAMPLE 3

*1,3-dibenzyl-cis-4-carboxy-5-formyl-imidazolidone-2 or its cyclic form; 3,4-(1',3'-dibenzyl-2'-keto-imidazolido)-2-keto-5-hydroxy-tetrahydrofuran*

To a solution of the 3.8 grams of 3,4-(1,3-dibenzyl-2'-keto-imidazolido) - 2 - keto-5-acetoxy-tetrahydrofuran, in about 30 cc. of dioxane, are added 10 cc. of 3 N aqueous sodium hydroxide. The solution is then acidified with 11 cc. of 3 N sulfuric acid and extracted with ether. The ether solution is washed with water, dried with sodium sulfate and concentrated in vacuo. The residue is recrystallized from a mixture of acetone, ether and petrol-ether. It forms colorless needles or prisms melting at 110° C.

The free 1,3-dibenzyl-cis-4-carboxy-5-formyl-imidazolidone-2 can be converted into 3,4-(1,3-dibenzyl-2'-keto-imidazolido)-2-keto-5-acetoxy (or propionoxy)-tetrahydrofuran by treating it with the corresponding acid anhydrides or chlorides.

EXAMPLE 4

*3,4-(1',3'-dibenzyl-2'-keto-imidazolido)-2-keto-5-propionoxy-tetrahydrofuran*

A solution of 1.3 grams of 1,3-dibenyl-cis-4-carboxy-5-formyl-imidazolidone-2 in 10 cc. of propionic anhydride is heated on the steam bath for 3 hours. The solution is concentrated in vacuo, and the residue is recrystallized from a mixture of ether and petrol-ether. Prisms or flat needles melting at 114.5–116° C. are obtained.

EXAMPLE 5

*Lactone of 1,3-dibenzyl-cis-4-carboxy-5-hydroxymethyl-imidazolidone-2 or 3,4-(1',3'-dibenzyl-2'-keto-imidazolido)-2-keto-tetrahydrofuran*

To a cooled solution of 22.8 grams of 3,4-(1',3'-dibenzyl-2'-keto-imidazolido)-2-keto-5-acetoxy-tetrahydrofuran in 50 cc. of dioxane, are added 41–42 cc. of 3 N sodium hydroxide, so that the solution becomes slightly alkaline against phenolphthalein. Then Raney nickel is added, and the mixture is hydrogenated at room temperature and 50–80 atm. pressure for 6 hours. The solution is filtered, cooled with ice and acidified with 3 N sulfuric acid. A few cc. of ether are added, to speed up the crystallization of the precipitated free acid, the 1,3-dibenzyl-cis-4-carboxy-5-hydroxymethyl-imidazolidone-2. The mixture is then heated for 3 hours to 80° C. and the oil formed is separated and recrystallized from a mixture of benzene, ether and petroleum ether. 3,4-(1',3'-dibenzyl-2'-keto-imidazolido)-2-keto-tetrahydrofuran melting at 107°–108° C. is thus obtained. In an alternative procedure, the hydroxy-acid is filtered off, dried, dissolved in 40 cc. of dry pyridine. 20 cc. of acetic anhydride are added under cooling and the mixture is left for 14 hours at room temperature. The solution is then concentrated in vacuo and the residue is recrystallized as above.

EXAMPLE 6

*Lactone of 1,3-dibenzyl-cis-4-carboxy-5-hydroxymethyl-imidazolidone-2*

A solution of 2 grams of the anhydride of the 1,3-dibenzyl-imidazolidone-(2)-cis-4,5-dicarboxylic acid in about 100 cc. of absolute dioxane, containing 2 cc. of N-methyl-morpholine, is hydrogenated in a shaking autoclave with Raney nickel as catalyst under 170 atmospheres pressure for 15 hours at 100° C. and 8 hours at 100–120° C. The cooled mixture is filtered, the solution concentrated in vacuo, the residue dissolved in ethyl acetate and washed with dilute hydrochloric acid. The ethyl acetate solution is then dried with anhydrous sodium sulfate and concentrated in vacuo. The reaction product so obtained is heated with thionyl chloride or acetic anhydride, the mixture is concentrated in vacuo, and the residue dissolved in a small amount of hot benzene. The unreacted anhydride of the dibenzyl-imidazolidone-dicarboxylic acid crystallizes out after cooling. It is filtered off, the remaining solution is concentrated in vacuo, and the residue is distilled in high vacuo (130–160° C., 0.1–0.2 mm.). The oily distillate is dissolved in a few drops of acetone, then ether is added. The lactone crystallizes from ether or acetone-ether-petrolether in thick colorless plates. M. P. 107–108° C.

EXAMPLE 7

*Lactone of cis-4-carboxy-5-hydroxymethyl-imidazolidone-2 or 3,4-(2'-keto-imidazolido)-2-keto-tetrahydrofuran*

200 mg. palladous oxide are suspended in about 30 cc. of dioxane and are reduced with hydrogen. Then 350 mg. (1.09 m. mole) lactone of 1,3-dibenzyl-cis-4-hydroxymethyl-5-carboxy-imidazolidone-2, 7 drops of concentrated hydrochloric acid and 1 cc. of water are added, and the mixture is shaken at room temperature, with hydrogen under atmospheric pressure, until the calculated amount of hydrogen (2.18 m. moles) is absorbed (8–9 hours). The mixture is filtered and the solution concentrated in vacuo with some added benzene. The crystalline residue is recrystallized from methanol or methanol-benzene. Colorless prisms (from methanol) or flat needles (from methanol-benzene) are formed. The substance is insoluble in most organic solvents, and is soluble in water. It can be sublimed in high vacuo at 160–170° C. (0.1 mm.). M. P. 200–202° C.

EXAMPLE 8

*Meso-bis-p-methoxybenzylamino-succinic acid*

200 grams of p-methoxy-benzylamine (1.45 moles) are added dropwise with stirring to a boiling solution of 52 grams of meso-dibromosuccinic acid (0.19 mole) dissolved in 510 cc. alcohol. The mixture is refluxed and stirred for about 5½ hours. After about 2 hours, the precipitate, which is thick at the beginning of the reaction, becomes very fine. With stirring and slight heating, about 75 cc. of concentrated hydrochloric acid (0.75 mole) are added, which causes the pH of the reaction mixture to drop to 3, thereby neutralizing the excess of p-methoxy-benzylamine. The pH is then brought back to 5 by adding a solution of sodium acetate, and after adding 250 cc. water, about 300 cc. of alcohol are distilled off. The precipitated reaction product is then filtered off and thoroughly washed with water on the funnel. It can be recrystallized from 90 per cent aqueous acetic acid. M. P. 225–226° C.

EXAMPLE 9

*1,3-di-p-methoxy-benzyl-imidazolidone-(2)-cis-4,5-dicarboxylic acid and its anhydride, or 3,4-(1',3'-di-p-methoxy-benzyl-2'-keto-imidazolido)-2,5-diketo-tetrahydrofuran*

338 grams of bis-p-methoxybenzylamino-succinic acid are dissolved in 1.4 liters of 3 N potassium hydroxide and 5 liters of water. The temperature of the solution is kept at 5° C. by means of external cooling. 665 cc. of a 30% solution of phosgene in xylene and 1850 cc. of 3 N potassium hydroxide are added dropwise and alternately to the stirring solution in such a way that its pH continuously remains between 8 and 9. The addition takes about 2 hours. The reaction mixture is acidified with concentrated hydrochloric acid. The precipitate is filtered off and thoroughly washed with water. The combined water washings and the original filtrate are thoroughly extracted with ethyl acetate. The precipitate is stirred with warm acetone, the suspension filtered, and the process repeated about 8 times. The combined acetone extracts are concentrated in vacuo, and the oily residue is treated several times with benzene, which is distilled off in vacuo, until the residue solidifies, forming 1,3-di-p-methoxybenzyl-imidazolidone-(2)-cis-4,5-dicarboxylic acid. The suspension of the imidazolidone-dicarboxylic acid in benzene is then filtered. After drying in vacuo at room temperature, 185 grams of the acid are obtained. The dicarboxylic acid, recrystallized three times from a mixture of ethyl acetate, ether and benzene, melts at 77–92° C. On further heating it resolidifies, and finally melts at 159–165° C. The acid crystallizes in fine needles.

The above-mentioned ethyl acetate extract and benzene filtrate, which contain some more of the imidazolidone-dicarboxylic acid, are concentrated in vacuo. The oily residue is refluxed for a few minutes with acetate anhydride to form the anhydride of the dicarboxylic acid. After distilling off the acetic anhydride in vacuo, the residue is treated with benzene, whereupon the anhydride crystallizes out in needles. The anhydride can be recrystallized from benzene. It crystallizes with one mole of benzene and melts at 161° C. The anhydride can also be prepared by treating the pure dicarboxylic acid with acetic anhydride.

EXAMPLE 10

*Cyclic acetate of 1,3-di-p-methoxybenzyl-cis-4-carboxy-5-formyl-imidazolidone-2 or 3,4-(1,3-di-p-methoxybenzyl-2'-keto-imidazolido)-2-keto-5-acetoxy-tetrahydrofuran*

112 grams of 1,3-di-p-methoxybenzyl-imidazolidone-(2)-cis-4,5-dicarboxylic acid are refluxed for 10 minutes with 840 cc. acetic anhydride. The clear solution is cooled slightly; 325 grams of zinc dust and 330 cc. acetic acid are added, and the reaction mixture is stirred and refluxed for 16 hours. After cooling, ethyl acetate is added and the zinc and zinc acetate is extracted 3 times with boiling ethyl acetate. The combined ethyl acetate washings and filtrates are concentrated in vacuo, and the residual oil is treated with benzene. After allowing the solution to stand for a few hours at room temperature, zinc acetate and unchanged starting material are separated by decantation. After distilling off the benzene in vacuo, the residue crystallizes upon treatment with ether and petrol-ether. M. P. 80-93° C. After two recrystallizations from acetone-ether, the melting point is 110-111° C.

Alternatively, the anhydride of the dicarboxylic acid can be reduced with zinc in a mixture of acetic acid and acetic anhydride to form the cyclic acetate.

EXAMPLE 11

*1,3-di-p-methoxybenzyl-cis-4-carboxy-5-hydroxy-methyl-imidazolidone-2*

4.4 grams of the cyclic acetate of 1,3-di-p-methoxybenzyl-cis-4-carboxy-5-formyl- imidazolidone-2 are dissolved in 25 cc. of dioxane. The solution is made alkaline to phenol-phthalein by adding 10 cc. of 2 N sodium hydroxide. On adding a few drops of acetic acid the pH is brought back to 7. The 1,3-di-p-methoxybenzyl-cis-4-carboxy-5 - formyl - imidazolidone - 2 thus formed is catalytically hydrogenated with Raney nickel to the 1,3-di-p-methoxybenzyl-cis-4-carboxy-5-hydroxymethyl - imidazolidone - 2. The theoretical amount of hydrogen is absorbed in 2 hours. The catalyst is filtered off, washed with water and the combined filtrates are acidified to pH 1 with 3 N sulfuric acid. On adding ether and cooling the solution, the hydroxymethyl acid crystallizes. It is filtered off and washed with water until the washings are neutral. Recrystallized several times from acetone, the hydroxymethyl acid melts at 143-145° C. The acid crystallizes in fine needles.

EXAMPLE 12

*Lactone of 1,3-di-p-methoxybenzyl- cis - 4 - carboxy-5-hydroxymethyl-imidazolidone-2- or 3,4-(1',3'-di-p-methoxybenzyl - 2' - keto-imidazolido) -2-keto-tetrahydrofuran*

Four cc. of acetic anhydride are added slowly with cooling to a cold solution of 1 gram 1,3-di-p - methoxybenzyl - cis -4- carboxy - 5 - hydroxymethyl-imidazolidone-2 in 8 cc. pyridine. The solution is kept cold during 16 hours and for another 4 hours at room temperature, whereupon it is concentrated in vacuo. The residue is treated with xylene, which is distilled off in vacuo. The oily residue crystallizes then on adding ether. The melting point remains constant at 102-104° C., after two further crystallizations from ether-petrolether.

The lactone can also be obtained by heating the hydroxymethyl acid in vacuo at 120-180° C. Water is split off, and the oil which is obtained can be recrystallized as above.

EXAMPLE 13

*Lactone of cis-4-carboxy-5-hydroxymethyl-imidazolidone-2 or 3,4-(2'-keto-imidazolido)-2-keto-tetrahydrofuran*

2 grams of 1,3-di-p-methoxybenzyl-cis-4-carboxy - 5 - hydroxymethyl - imidazolidone-2, dissolved in a mixture of 150 cc. methanol and 5 cc. conc. hydrochloric acid, are catalytically hydrogenated in the presence of 2 grams of previously reduced palladium. The hydrogen uptake is theoretical after about 20 hours. The solution is filtered, concentrated in vacuo, and the residue treated with benzene, which is distilled off. The solid residue, recrystallized twice from methanol, melts at 200-202° C. It shows no depression of its melting point when mixed with the lactone prepared by debenzylation of the lactone of 1,3-dibenzyl - cis - 4-carboxy - 5 - hydroxymethyl-imidazolidone-2, Example 7.

EXAMPLE 14

*Barium salt of imidazolidone-(2)-cis-4,5-dicarboxylic acid*

To a stirred ice-cooled solution of 7.5 grams (=0.05 mole) of meso-diamino-succinic acid in 40 cc. of 3 N sodium hydroxide, are added 30 cc. of a 30% solution of phosgene in xylene (=0.09 mole) and another 40 cc. 3 N sodium hydroxide. Both solutions are added dropwise within one hour. After all the phosgene has reacted, the solution is slightly acidified (pH 5) with hydrochloric acid. A small amount of unreacted meso-diamino-succinic acid precipitates, if present, and is filtered off. The clear solution is neutralized with sodium hydroxide, boiled up and mixed with a boiling solution of 20 grams barium chloride in 100 cc. of water. The crystalline barium salt precipitates immediately and is filtered off after 15 hours. The barium salt can be recrystallized from large amounts of boiling water.

EXAMPLE 15

*Sodium salt of imidazolidone-(2)-cis-4,5-dicarboxylic acid*

A boiling solution of 71 grams of sodium sulfate (anhydrous) in 150 cc. of water is added to a suspension of 154 grams of the above barium salt in 500 cc. of boiling water. The mixture is heated on the steam bath for one hour, then the barium sulfate is filtered off, and the solution containing the sodium salt is concentrated in vacuo until crystallization starts. Hot alcohol is then added to precipitate the sodium salt. It is filtered off after 24 hours, washed with dilute alcohol, alcohol and ether.

EXAMPLE 16

*Imidazolidone-(2)-cis-4,5-dicarboxylic acid*

55.5 cc. boiling 1.8 N sulfuric acid are added to a suspension of 15.5 grams of the barium salt of imidazolidone-cis-4,5-dicarboxylic acid in 80 cc. of boiling water. The solution is freed from barium or sulfate ions still present, by the addition of sulfuric acid, or barium hydroxide. The barium sulfate is filtered off, and the aqueous solution is concentrated in vacuo. The free dicarboxylic acid separates in colorless prisms and can be recrystallized from water. The substance has no sharp melting point and decomposes with foaming at about 222-225° C.

EXAMPLE 17

*Anhydride of imidazolidone-(2)-cis-4,5-dicarboxylic acid or 3,4-(2'-keto-imidazolido)-2,5-diketo-tetrahydrofuran*

A. A mixture of 25 cc. of thionylchloride and 75 cc. of dry dioxane is added to a stirred suspension of 20 grams of sodium salt of imidazolidone-(2)-cis-4,5-dicarboxylic acid in 200 cc. boiling dry dioxane. Stirring and refluxing is continued for 10 minutes until the precipitate turns yellow. The mixture is then concentrated in vacuo and the residue is extracted with boiling dry dioxane (about 5 × 100 cc.). The dioxane extracts are concentrated in vacuo and the remaining crystalline reaction product is filtered off and washed with some cold dioxane. This anhydride crystallizes from dioxane in prisms containing dioxane of crystallization; the melting point depends very much on the rate of heating and varies between 215 and 230° C. The product loses dioxane on drying in vacuo at 60° C. This product is very sensitive to atmospheric moisture. The barium salt of the dicarboxylic acid can be used instead of the sodium salt. In that case, the time needed for the reaction is longer and the yield is lower.

B. 1.25 grams of the barium salt of imidazolidone-cis-4,5-dicarboxylic acid is shaken for 30 hours at room temperature with a mixture of 200 cc. acetic anhydride and 0.6 cc. of acetylchloride. The barium chloride is filtered off and the solution is diluted with 100 cc. dry benzene. The anhydride precipitates in form of prisms and is identical with the product obtained according to procedure A. The yield, however, is lower.

The mono-methylester of imidozolidone-(2)-cis-4,5-dicarboxylic acid can be prepared by refluxing 0.1 gram anhydride of imidazolidone-(2)-cis-4,5-dicarboxylic acid for five minutes with 5 cc. methanol. The solution is concentrated and the product recrystallized from methanol. Colorless prisms melting at 174–175° C. The monoethyl ester is prepared in the same way with ethyl alcohol and melts at 174–176° C.

The dimethylester of imidazolidone-(2)-cis-4,5-dicarboxylic acid can be prepared as follows:

A mixture of 6.2 grams of the barium salt of imidazolidone-(2)-cis-4,5-dicarboxylic acid, 8 cc. of 6.75 N freshly prepared methanolic hydrogen chloride solution, and 33 cc. of absolute methanol is shaken at room temperature for 24 hours. After addition of 50 cc. of dioxane, the solution is filtered and concentrated in vacuo. The residue is dissolved in a mixture of acetone and dioxane; the solution is filtered and concentrated. After recrystallization from a mixture of acetone and ether, or methanol and ether, pure dimethyl ester is obtained in the form of fine colorless needles. It is very soluble in methanol or water. M. P. 135–136° C.

This compound can also be prepared from the dicarboxylic acid or the corresponding monomethylester with diazomethane, or by treating the monomethylester with thionylchloride and then with methanol.

EXAMPLE 18

*Acetyl derivatives of the anhydride of imidazolidone-(2)-cis-4,5-dicarboxylic acid*

By employing larger amounts of acetyl chloride than in Example 17(B) and higher temperatures, the mono- and diacetyl derivatives of the anhydride are formed. Thus, 5 grams of the barium salt of imidazolidone-cis-dicarboxylic acid are refluxed for 2 hours with a mixture of 15 cc. of acetic anhydride and 50 cc. acetyl-chloride. The hot solution is filtered, the precipitate is washed with hot ethyl acetate, and the combined solutions are diluted with benzene. The crystals formed are filtered off after several days, and are recrystallized from ethyl acetate. There are obtained prisms melting at 193–197° C. The product consists mostly of the monoacetyl derivative of the anhydride. The product can be hydrated to the corresponding monoacetyl derivative of the dicarboxylic acid.

The precipitate sometimes has a much lower melting point (130–150° C. instead of 180–190° C. as usual), especially if the reaction was carried on for a somewhat longer time. The analysis shows that the reaction product is the diacetyl anhydride.

To hydrate the monoacetyl anhydride, it is dissolved in a small amount of water. The solution is concentrated and the residual product is recrystallized from a very small amount of water. Prisms of monoacetyl-imidazolidone-(2)-cis-4,5-dicarboxylic acid melting at 193–195° C. are thus obtained.

EXAMPLE 19

*Diacethyl-imidazolidone-(2)-4,5-cis-dicarboxylic acid and acetate of the cyclic form of monoacetyl-cis-4-carboxy-5-formyl-imidazolidone-2 or 3,4-(monoacetyl-2'-keto-imidazolido)-2-keto-5-acetoxy-tetrahydrofuran*

A stirred suspension of 44 grams of the sodium salt (or the corresponding amount of barium salt) of imidazolidone-(2)-cis-4,5-dicarboxylic acid in a mixture of 60 cc. of acetic acid and 300 cc. of acetyl chloride is first refluxed for 4 hours then stirred at room temperature for 15 hours. The mixture is then heated up again, diluted with warm ethyl acetate and filtered. The filtrate containing the acetylated anhydride of imidazolidone-(2)-cis-4,5-dicarboxylic acid is concentrated in vacuo, and the residual mixture (oil and crystals) is dissolved in 350 cc. of acetic anhydride. 150 cc. of acetic acid and 175 grams of zinc powder are added, and the mixture is stirred and refluxed for 23 hours. Hot ethyl acetate is added, and the mixture is filtered and the zinc is washed several times with hot ethyl acetate. The solutions are combined and concentrated in vacuo. The residue is heated up with benzene and becomes partly crystalline. The benzene insoluble crystals are filtered off and are recrystallized from water. Needles melting at 207–211° C. are thus obtained. The analysis shows that this compound is a hydrate of the diacetyl-imidazolidone-(2)-cis-4,5-dicarboxylic acid.

The benzene solution containing the cyclic acetate of the diacetyl-cis-4-carboxy-5-formyl-imidazolidone-2 is concentrated in vacuo. A small amount of water is added to the residual oil to hydrolyze one of the acetyl groups. After several hours the product is converted into benzene insoluble prisms, which are recrystallized from water and melt then at 193–195° C. This product is the cyclic acetate of monoacetyl-cis-4-carboxy-5-formyl-imidazolidone-2.

EXAMPLE 20

*Lactone of monoacetyl-cis-4-carboxy-5-hydroxymethyl-imidazolidone-2 or 3,4-(monoacetyl-2'-keto-imidazolido)-2-keto-tetrahydrofuran*

An aqueous solution of 2.42 grams of cyclic acetate of monoacetyl-cis-4-carboxy-5-formyl-imidazolidone-2 is made alkaline with barium hydroxide solution (about 20 m. equivalents are required to make the mixture alkaline against phenolphthalein). A few drops of dilute acetic acid are added, to adjust the pH to 6–7. Then Raney nickel is added, and the mixture is shaken with hydrogen at atmospheric pressure and room temperature until the calculated amount of hydrogen is absorbed (about 250 cc. hydrogen). The catalyst is filtered off and the solution is freed completely of barium ions with the calculated amount of sulfuric acid (no excess of sulfuric acid should be present). The barium sulfate is filtered off, the aqueous solution is concentrated in vacuo, and the residual oil is recrystallized from methanol. Prisms melting at 191–193° C. are obtained.

EXAMPLE 21

*Lactone of cis-4-carboxy-5-hydroxymethyl-imidazolidone-2*

A solution of 0.1 gram of the lactone of monoacetyl-cis-4-carboxy-5-hydroxymethyl - imidazolidone-2 in 10 cc. of 0.19 N barium hydroxide solution is heated for one hour on the steam bath and then kept at room temperature for 60 hours. The mixture is freed completely of barium ions with 0.1 N sulfuric acid (no excess sulfuric acid should be present). The barium sulfate is centrifuged off, the aqueous solution is concentrated in vacuo and the residual crystals are recrystallized from methanol. Prisms melting at 200–202° C. are obtained.

The product is identical with the compound obtained by debenzylation of the corresponding dibenzyl-lactone described in Example 7.

EXAMPLE 22

*Lactone of diacetyl-cis-4-carboxy - 5 - hydroxymethyl-imidazolidone - 2 or 3,4 - (diacetyl-2'-keto-imidazolido) -2-keto-tetrahydrofuran*

A solution of 100 mg. lactone of cis-4-carboxy-5-hydroxymethyl-imidazolidone-2 in 10 cc. acetic anhydride is refluxed for 3 hours. The solution is concentrated in vacuo, and the residual crystals are recrystallized from a mixture of dioxane and ether. Plates melting at 175–176.5° C. are obtained.

The same compound is obtained from 3,4-(monoacetyl-2'-keto-imidazolido) -2-keto - tetrahydrofuran when it is refluxed with acetic anhydride.

EXAMPLE 23

*Lactone of dipropionyl-cis-4-carboxy-5-hydroxymethyl-imidazolidone-2 or 3,4-(dipropionyl-2'-keto-imidazolido) -2-keto-tetrahydrofuran*

A solution of 100 mg. of the lactone of cis-4-carboxy-5-hydroxymethyl - imidazolidone-2 in 5 cc. of propionic anhydride is refluxed for 3 hours. The solution is concentrated in vacuo, and the residual crystals are recrystallized from a mixture of dioxane and ether. Flat needles melting at 190.5° C. are obtained.

EXAMPLE 24

*Anhydride of 1-benzyl - 3 - acetyl-imidazolidone-(2) -cis-4,5-dicarboxylic acid or 3,4-(1'-benzyl-3'-acetyl-2'-keto-imidazolido) -2,5-diketo - tetrahydrofuran*

2 grams of 1-benzyl-imidazolidone-2-cis-4,5-dicarboxylic acid are refluxed for 5 hours with acetic anhydride. The solution is then concentrated in vacuo and the residue is recrystallized from a mixture of benzene and petroleum ether, forming fine needles melting at 75–76° C.

The 1-benzyl-imidazolidone - (2) - cis - 4,5-dicarboxylic acid can be prepared as follows:

1.0 gram of sodium is added in portions to a suspension of 3.5 grams of 1,3-dibenzyl-imidazolidone-(2)-cis-4,5-dicarboxylic acid in 100 cc. of liquid ammonia. The slight excess of unreacted sodium is destroyed with ammonium chloride, and the ammonia is evaporated. The residue is dissolved in water and the reaction product is precipitated with 3 N hydrochloric acid. It can be recrystallized from hot water, forming needles melting at 190–193° C. with decomposition. The substance contains one molecule of water of crystallization.

The dimethylester of 1-benzyl-imidazolidone-(2) - cis - 4,5 - dicarboxylic acid can be prepared by reacting 1-benzyl-imidazolidone - (2) - cis-4,5-dicarboxylic acid in methanol with a solution of diazomethane in ether. It crystallizes as thin plates from acetone-ether-petroleum ether, melting at 124–125.5° C.

The expression "oxy" as employed herein and in the claims means hydroxy and acyloxy as, for example, acetoxy, propionoxy, butyroxy and the like.

We claim:

1. A compound selected from the group consisting of a 3,4-(2'-keto-imidazolido) -2-tetrahydrofuran, a 3,4-(2-keto-imidazolido) -2-keto-5-lower acyloxy-tetrahydrofuran, a 3,4-(2'-keto-imidazolido) - 2-keto-5-hydroxy - tetrahydrofuran and its corresponding open form, cis-4-carboxy-5-formyl-imidazolidone-2, a 3,4-(2'-keto-imidazolido) -2,5 - diketo - tetrahydrofuran and the corresponding free dicarboxylic acid of the 3,4-(2'-keto-imidazolido) -2,5-diketotetrahydrofuran, the N-atoms of the imidazolido ring of said compounds carrying a member of the group consisting of hydrogen, aralkyl and lower acyl.

2. A 3,4-(2'-keto - imidazolido) -2-keto-5-hydroxy-tetrahydrofuran, the 1' and 3' positions carrying a member of the group consisting of hydrogen, aralkyl and lower acyl radicals.

3. A 3,4-(1',3'-diaralkyl-2'-keto-imidazolido) - 2-keto-5-hydroxy-tetrahydrofuran.

4. 3,4-(1',3'-dibenzyl - 2' - keto - imidazolido) - 2-keto-5-hydroxy-tetrahydrofuran.

5. A 3,4-(2' - keto-imidazolido) - 2,5 - diketotetrahydrofuran, the 1' and 3' positions containing a member of the group consisting of hydrogen, an aralkyl radical, and a lower acyl radical.

6. A 3,4-(2'-keto-imidazolido) -2-keto-5-lower acyloxy-tetrahydrofuran, the 1' and 3' positions containing a member of the group consisting of hydrogen, an aralkyl radical, and a lower acyl radical.

7. A 3,4-(1',3'-diaralkyl-2'-keto-imidazolido) - 2,5-diketo-tetrahydrofuran.

8. A 3,4-(1',3'-diaralkyl-2'-keto-imidazolido) - 2-keto-5-lower acyloxy-tetrahydrofuran.

9. 3,4-(1',3'-dibenzyl - 2' - keto - imidazolido) - 2,5-diketo-tetrahydrofuran.

10. 3,4-(1',3'-dibenzyl - 2'-keto - imidazolido) - 2-keto-5-acetoxy-tetrahydrofuran.

11. The process which comprises ring closing a meso-diamino-succinic acid to form the corresponding imidazolidone-(2) -cis-4,5-dicarboxylic acid, converting the latter compound into its anhydride, reducing the anhydride in the presence of a lower aliphatic acid and the anhydride of the acid to a 3,4-(2'-keto-imidazolido) -2-keto-5-lower acyloxy - tetrahydrofuran, hydrolyzing the latter to form the corresponding 3,4-(2'-keto-imidazolido) -2 - keto - 5 - hydroxy-tetrahydrofuran and its corresponding open form, cis-4-carboxy-5-formyl-imidazolidone-2, the N-atoms of the meso-diamino-succinic acid and of the imidazolido ring of said compounds carrying a member of the group consisting of hydrogen, aralkyl and lower acyl radicals.

12. The process as in claim 11 wherein the meso-diamino-succinic acid is meso-bis-benzylamino-succinic acid.

13. In a process of producing a 3,4-(2'-keto-imidazolido)-2 - keto - 5 - hydroxy - tetrahydrofuran and its corresponding open form, cis-4-carboxy - 5 - formyl - imidazolidone - 2, the step which comprises reacting a meso-bis-aralkylamino-succinic acid with phosgene to form 1,3-diaralkyl - imidazolidone - (2) -cis-4,5-dicarboxylic acid.

14. A process as in claim 13 in which aralkyl is benzyl.

15. In a process of producing a 3,4-(2'-keto-imidazolido) - 2 - keto - 5 - hydroxy-tetrahydrofuran and its corresponding open form, cis-4- carboxy-5-formyl-imidazolidone-2, the step which comprises ring closing a compound of the group consisting of an imidazolidone-2-cis-4,5-dicarboxylic acid and its salts to form the anhydride thereof, the N-atoms of the imidazolido ring of said compounds carrying a member of the group consisting of hydrogen, aralkyl and lower acyl radicals.

16. A process as in claim 15 in which the N-atoms carry a benzyl radical.

17. In a process of producing a 3,4-(2'-keto-imidazolido)-2-keto-5-hydroxy-tetrahydrofuran and its corresponding open form, cis-4-carboxy-5-formyl-imidazolidone-2, the step which comprises reducing a compound of the group consisting of an imidazolidone-(2)-cis-4,5-dicarboxylic acid and its anhydride in the presence of zinc, a lower aliphatic acid and the anhydride of the aliphatic acid to form a 3,4-(2'-keto-imidazolido)-2-keto-5-lower acyloxy-tetrahydrofuran, the N-atoms of the imidazolido ring of said compounds carrying a member of the group consisting of hydrogen, aralkyl and lower acyl.

18. In a process of producing 3,4-(1',3'-dibenzyl-2'-keto-imidazolido)-2-keto-5-hydroxy-tetrahydrofuran and its corresponding open form, 1,3-dibenzyl-cis-4-carboxy-5-formyl-imidazolidone-2, the step which comprises reducing the anhydride of 1,3-dibenzyl-imidazolidone-(2)-cis-4,5-dicarboxylic acid in the presence of zinc, acetic acid and acetic anhydride, to form 3,4-(1',3'-dibenzyl-2'-keto-imidazolido)-2-keto-5-acetoxy-tetrahydrofuran.

19. In a process for producing a 3,4-(2'keto-imidazolido)-2-keto-5-hydroxy-tetrahydrofuran and its corresponding open form, cis-4-carboxy-5-formyl-imidazolidone-2, the step which comprises hydrolyzing a 3,4-(2'-keto-imidazolido)-2-keto-5-lower acyloxy-tetrahydrofuran, the N-atoms of the imidazolido ring of said compounds carrying a member of the group consisting of hydrogen, aralkyl and lower acyl radicals.

20. The process as in claim 19 in which the N-atoms carry a benzyl radical.

MOSES WOLF GOLDBERG.
LEO H. STERNBACH.

No references cited.